United States Patent
Chiang et al.

(10) Patent No.: US 9,338,085 B2
(45) Date of Patent: May 10, 2016

(54) SMART MOBILITY MANAGEMENT ENTITY FOR UE ATTACHED RELAY NODE

(71) Applicant: Verizon Patent and Licensing Inc., Basking Ridge, NJ (US)

(72) Inventors: David Chiang, Fremont, CA (US); Lalit R. Kotecha, San Ramon, CA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 331 days.

(21) Appl. No.: 14/017,558

(22) Filed: Sep. 4, 2013

(65) Prior Publication Data

US 2015/0063122 A1   Mar. 5, 2015

(51) Int. Cl.
*H04L 12/28*   (2006.01)
*H04L 12/725*   (2013.01)
*H04L 12/707*   (2013.01)
*H04W 40/02*   (2009.01)
*H04W 40/22*   (2009.01)

(52) U.S. Cl.
CPC .............. *H04L 45/306* (2013.01); *H04L 45/22* (2013.01); *H04L 45/24* (2013.01); *H04W 40/02* (2013.01); *H04W 40/22* (2013.01); *H04L 12/28* (2013.01)

(58) Field of Classification Search
CPC ......... H04L 12/28; H04L 12/66; H04L 45/22; H04L 45/24; H04L 45/12
USPC ......................................... 370/401, 238, 255
See application file for complete search history.

(56) References Cited

U.S. PATENT DOCUMENTS

| | | | | |
|---|---|---|---|---|
| 6,934,249 | B1 * | 8/2005 | Bertin | H04L 12/5695 370/218 |
| 7,933,549 | B2 * | 4/2011 | Larsson | H04B 7/022 370/315 |
| 8,203,994 | B2 * | 6/2012 | Sheen | H04B 7/15592 370/328 |
| 8,798,528 | B2 * | 8/2014 | Wang | H04B 7/155 455/13.1 |
| 8,897,309 | B2 * | 11/2014 | Vikberg | H04L 12/66 370/230 |
| 2003/0048750 | A1 * | 3/2003 | Kobayashi | H04L 45/00 370/229 |
| 2004/0005893 | A1 * | 1/2004 | Isobe | H04L 45/00 455/436 |
| 2005/0068970 | A1 * | 3/2005 | Srikrishna | H04W 40/12 370/400 |
| 2005/0272366 | A1 * | 12/2005 | Eichinger | H04B 7/15528 455/9 |
| 2009/0163223 | A1 * | 6/2009 | Casey | H04W 36/22 455/453 |
| 2012/0020260 | A1 * | 1/2012 | Chen | H04W 28/08 370/310 |

* cited by examiner

*Primary Examiner* — Ricky Ngo
*Assistant Examiner* — Dewanda Samuel

(57) ABSTRACT

A system includes a communication section communicably connected to a network, and configured to receive requests for data flows from user equipment attached to the network. The system may further include a flow path determination section configured to determine, for each data flow requested, an optimal signal path from among a plurality of potential signal paths based on substantially current characteristics of the potential signal paths and on characteristics of the data flow requested. The system may further include a command plane section configured to control routing of each requested data flow in accordance with the optimal signal path determined by the flow path determination section for the respective data.

20 Claims, 9 Drawing Sheets

| Link | Characteristics | | | | |
|---|---|---|---|---|---|
| | Capacity | Currently Used | QoS Support | . . . | Latency |
| L1 | 10 Mbps | 8 Mbps | ✓ | . . . | 150 ms |
| L2 | 30 Mbps | 18 Mbps | ✓ | . . . | 100 ms |
| L3 | 20 Mbps | 17 Mbps | ✗ | . . . | 200 ms |
| ⋮ | ⋮ | ⋮ | ⋮ | ⋱ | ⋮ |
| LN | 15 Mbps | 11 Mbps | ✓ | . . . | 170 ms |

Figure 9

SMART MOBILITY MANAGEMENT ENTITY FOR UE ATTACHED RELAY NODE

BACKGROUND

In today's wireless networks, a principal concern has been how to optimize the use of scarce radio resources to support new emerging applications resident on a wireless device that use the radio resources to communicate with a remote end point. As the next generation wireless networks, such as long term evolution (LTE) networks, are being deployed, the concern has become even more critical. Further, today's wireless networks may include a multi-hop mesh topology, which may raise additional optimization challenges as there may be many possible signal paths between any given wireless device and a core network (such as an Evolved Packet Core (EPC)). Each of these different possible signal paths may have different characteristics from one another, and each path may have certain strengths and certain weaknesses, depending on the context, from a standpoint of network optimization.

BRIEF DESCRIPTION OF THE DRAWINGS

FIG. 9 illustrates an exemplary data store for signal path characteristics.

DETAILED DESCRIPTION

In a multi-hop mesh long term evolution (LTE) network, there may be many possible signal paths between a wireless device such as a piece of user equipment and the Evolved Packet Core (EPC), and each such signal path may have different characteristics from other signal paths such as jitter and latency. Further, different applications resident on the wireless device and configured to communicate with remote end points may require different types and levels of data flows that may have different minimum and/or optimum signal path requirements—for example browsing the Internet, making a telephone call, sending email or utilizing Short Message Service (SMS), etc., might each require data flows having different minimum and/or optimum signal path requirements. Even the same application may have dissimilar requirements under different operational modes or situations. Thus, one flow may preferably be routed on one signal path between the wireless device and the EPC, while a second flow of a different type may preferably be routed on a second signal having dissimilar characteristics from that of the first signal path. Additionally, the wireless device itself may have certain characteristics which may affect a determination of which signal path is optimal for a given data flow. Moreover, a path that is best for a given data flow from the perspective of that individual data flow may not be the best path from the perspective of overall network optimization, and vice versa. Moreover, optimal paths may change over time as network conditions change.

A smart Mobility Management Entity (MME) may be able to determine optimal paths for different data flows based on the characteristics of the different flows, the characteristics of the different signal paths, and the characteristics of the wireless device requesting the flow, and control routing of the data flows accordingly. The smart MME may determine the optimal paths on a user-equipment-by-user-equipment basis and on a flow-by-flow basis such that optimization of overall network usage is balanced against optimization from an individual data flow perspective. The smart MME may dynamically control the flows based on current network conditions, and may reroute data flows away from signal paths previously determined to be optimal for the respective data flows upon changes in network conditions.

Fourth Generation (4G) wireless networks, as defined by the 3rd Generation Partnership Project (3GPP) standardization, are used herein to facilitate explanation of the systems, apparatuses, methods, etc. disclosed herein. Nevertheless, the disclosed examples are intended to be illustrative, not limiting, and the systems, apparatuses, methods, etc. disclosed herein may be applied to other types of packet-switched and/or wireless networks.

Figure 1:
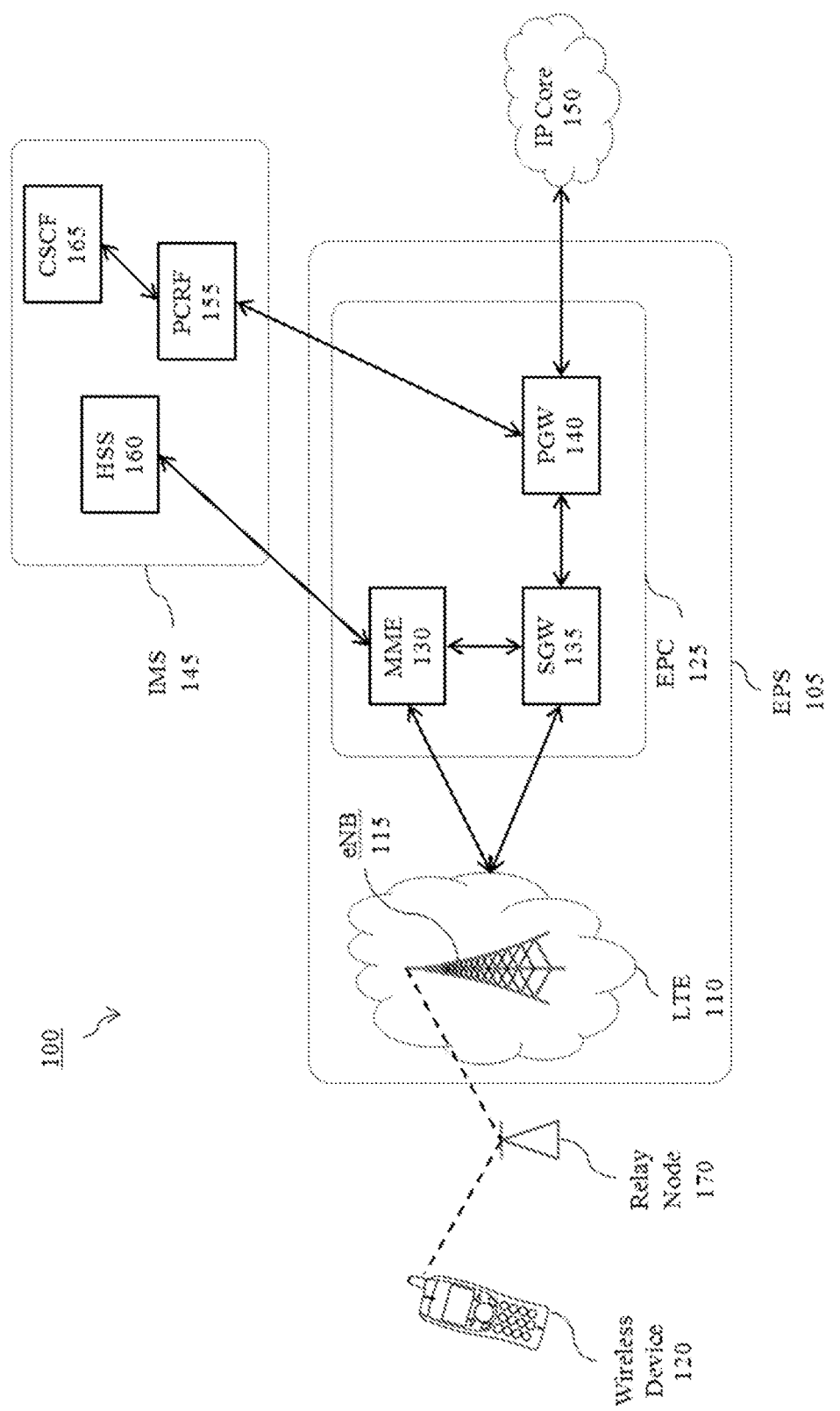
FIG. 1 illustrates an exemplary system for communication of data.

FIG. 1 illustrates an exemplary system 100 including an Evolved Packet System (EPS) 105 architecture in a wireless network. The wireless network may be a combination of different networks or a single wireless network. Examples of possible wireless networks include Wi-Fi, Bluetooth, cellular networks, ad-hoc wireless networks, etc.

In one illustrative example, system 100 may further include a Long Term Evolution (LTE) network 110 having one or more eNode B nodes (eNB nodes) 115. The one or more eNB nodes 115 may be in communication with an Evolved Packet Core (EPC) 125 and with one or more wireless devices 120 either directly or via relay nodes (RN) 170. The EPC 125 may include a Mobility Management Entity (MME) 130, a Serving Gateway (SGW) 135, and a Packet Data Network (PDN) gateway (PGW) 140, and may be in communication with an IP Multimedia Subsystem (IMS) 145 and an IP core 150. While shown logically within the EPC 125, the physical locations of each device may be remote from one another. The IMS 145 may include a policy and charging rule function (PCRF) 155, a home subscriber server (HSS) 160, and a call session control function (CSCF) 165. While shown logically within the IMS 145, the physical locations of each device may be remote from one another. System 100 may take many different forms and include multiple and/or alternate components and facilities. While an exemplary system 100 is shown in FIG. 1, the exemplary components illustrated in the Figure are not intended to be limiting. Indeed, additional or alternative components and/or implementations may be used.

LTE 110 is a growing standard in the mobile network technology, including enhancements over earlier global system for mobile communications (GSM), enhanced data for global evolution (EDGE) and universal mobile telecommunications system (UTMS) network technologies. An LTE 110 network may provide high downlink rates and uplink rates and low radio access network (RAN) round-trip times compared to previous systems. The LTE 110 may include one or more nodes 115, such as the illustrated eNode B (eNB) node 115, which combine the functionality of both base station and radio access controllers (RNC) of 2G or 3G radio access networks. The eNB nodes 115 may accordingly support the LTE 110 air interface and may include functions for radio resource control, user plane ciphering and packet data convergence protocol (PDCP).

The eNB nodes 115 of the LTE 110 may provide communications services to one or more wireless devices 120. A wireless device 120 may include any device or devices configured to be operated by one or more users, such as a cellular telephone, laptop computer, tablet computing device, or personal digital assistant, among other exemplary devices. In addition to network functionality, wireless device 120 may include one or more components capable of receiving input such as voice and data entry from a user, and providing output to the user such as audible and/or visual output.

A portion of the LTE 110 standard specifies the inclusion of a flat IP-based network architecture designed to replace the general packet radio service (GPRS) core network often used for 2G and 3G cellular communication systems. Accordingly, the EPC 125 may be an IP network and may be substantially packet-switched. Services such as voice which are traditionally circuit-switched, may accordingly be provided as packet-switched communications over the EPC 125.

As mentioned above, the EPC 125 may include a MME 130, a SGW 135, and a PGW 140. The MME 130 may be configured to manage mobility information, wireless device 120 identities, and security parameters. The SGW 135 may be configured to operate as a gateway between the EPC 125 and the LTE 110. The PGW 140 may be configured to operate as the gateway between the EPC 125 and a packet data network (PDN), i.e., the IP core 150.

The MME 130 may further be configured to perform control-plane functionality, as compared to the SGW 135 and PGW 140, which may be configured to perform bearer-plane functionality. Control-plane functionality includes protocols and communications paths used to configure the network to meet wireless device demand for data services, such as the establishment of connections, the control of attributes, the routing or re-routing of established connections, and the assignment and reassignment of resources to wireless device 120. Bearer-place functionality includes protocols and communications paths configured to transmit the requested data services, such as to transmit Voice over Internet Protocol (VoIP) and/or video session data. The split in responsibility allows for independent scaling and growth of throughput traffic as compared to the scaling and growth of the control signal processing. It also allows operators to choose optimized topological locations of MME 130, SGW 135, PGW 140 elements within the EPC 125 to optimize the network in different aspects, such as to reduce network latency.

The EPC 125 may utilize an IP Multimedia Subsystem (IMS) 145 network to facilitate packet-switched voice communications. An exemplary IMS 145 architecture is shown in FIG. 1. While other protocols are possible, the session initiation protocol (SIP) has been accepted as a 3GPP signaling protocol for use by the IMS 145 for IP-based streaming multimedia services wireless networks.

The HSS 160 may be one or more databases configured to store user information and user profiles and while shown logically within the IMS, may be located at a physical location remote from the rest of the IMS. The MME 130 of the EPC 125 may be in communication with the HSS 160 and may accordingly facilitate SIP calling functionality.

The CSCF 165 may be a central node in the IMS 145, and may be implemented as a SIP server configured to processes SIP signaling in the IMS 145. Four exemplary types of CSCFs 165 are as follows: Proxy CSCF 165 (P-CSCF); Serving CSCF 165 (S-CSCF); Interrogating CSCF 165 (I-CSCF); and Emergency CSCF 165 (E-CSCF).

The P-CSCF 165 may be a first point of contact between an IMS-based user terminal and the IMS 145 network. The P-CSCF 165 may be configured to function as an outbound/inbound SIP proxy server, where the requests initiated by the user terminals will traverse to the P-CSCF 165.

The S-CSCF 165 may be configured to operate as the central node of the signaling plane. Accordingly, the S-CSCF 165 may be a SIP server, but may also perform session control.

The I-CSCF 165 may be another SIP proxy located at the edge of an administrative domain. An IP address of the I-CSCF 165 may be published in a domain name system (DNS) record, such that remote servers may be able to locate the I-CSCF 165 via DNS and use the I-CSCF 165 as a forwarding point for SIP packets to the domain of the I-CSCF 165. In addition to SIP proxy functionality, the I-CSCF 165 may further be configured to have an interface to the HSS 160 to retrieve user information and routes the SIP request to the appropriate destination (e.g., S-CSCF 165).

The E-CSCF 165 may be configured to route emergency calls (e.g., 911 calls) to appropriate destinations.

In addition to the CSCF 165 and the HSS 160, the IMS 145 may contain one or more adjunct nodes. These adjunct nodes may include a policy and charging control function (PCRF) 155, as well as a subscription profile repository (SPR) 155, and various application servers (AS), such as SIP application servers, instant messaging application servers, and presence application servers.

Figure 2:
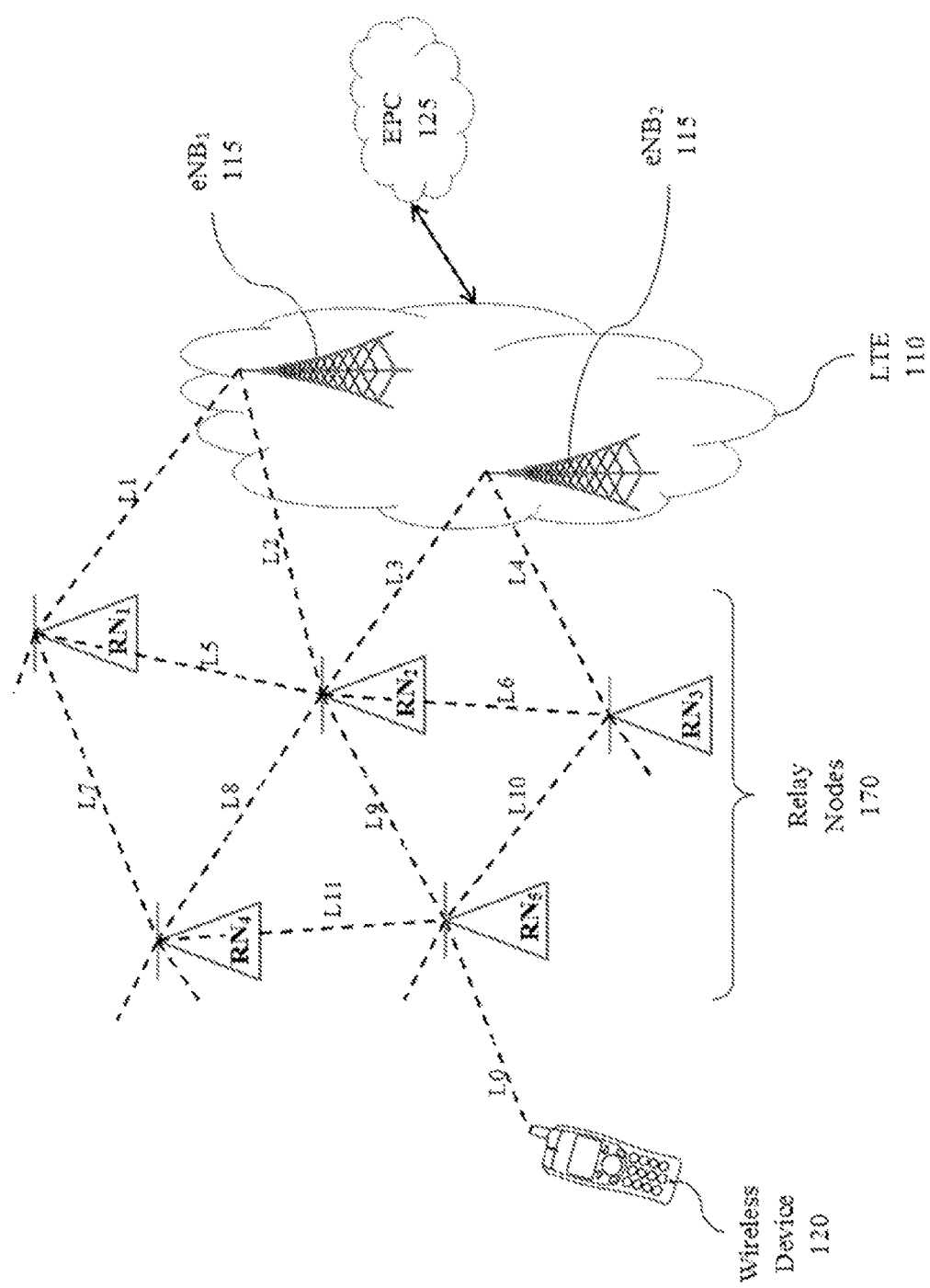
FIG. 2 illustrates an exemplary access network of the exemplary system of FIG. 1.

The system 100 may further include an access network having a multi-hop mesh topology, such as that shown in the exemplary illustration of FIG. 2. The exemplary access network shown in FIG. 2 includes an LTE 110 network connected to an EPC 125, with the LTE 110 including one or more eNB nodes 115 (eNB, and $eNB_2$ in the Figure). The exemplary network shown in FIG. 2 also includes multiple relay nodes 170 ($RN_1$ to $RN_5$ in the Figure) and one or more wireless devices 120. In a network with a multi-hop mesh topology (referred to hereinafter for simplicity as a "mesh network"), such as the one illustrated in FIG. 2, there are multiple relay nodes 170 that are each connected to various other relay nodes 170 (generally wirelessly) in such a manner as to form a mesh of connections. That is, each relay node 170 may be connected to multiple adjacent relay nodes such that there are a multiplicity of possible signal paths between terminals of the mesh network (e.g., between wireless device 120 and an eNB 115). For example, in FIG. 2 an exemplary mesh network is shown in which there are five relay nodes 170, $RN_1$ through $RN_5$. These relay nodes 170 are connected variously to each other and to the two eNB nodes 115 via connections L1 through L11, such that a data flow between the wireless device 120 and the EPC 125 can take any one of multiple possible signal paths. For example, communication between the wireless device 120 and the EPC 125 may take a signal path comprising connections L0, L11, L7, and L1, or the communication may take a different signal path comprising connections L0, L9, L2 (or any other one of the multiplicity of possible signal paths).

A wireless device 120 may attach to the network via one of the relay nodes 170 (generally, the nearest active relay node 170). For example in FIG. 2 the wireless device 120 is connected to relay node $RN_5$ via connection L0. If the wireless device 120 moves around or the initial relay node 170 becomes unavailable, the wireless device 120 may switch connections to a different relay node 170.

Each of the connections L1 through L11 (also referred to as "links") may have different characteristics from one another. Characteristics of the connections L1 through L11 include aggregate characteristics of the connection as a whole such as maximum bandwidth, current aggregate usage (occupancy), QoS, average latency, average jitter, average packet error loss rate, etc. Further, characteristics of the connections L1 through L11 may be considered on a per-QoS class basis in addition to in the aggregate, such as utilization per-QoS class, latency per-QoS class, jitter per-QoS class, packet loss per-QoS class, etc.

Each of the possible signal paths between the wireless device 120 and the EPC 125 may have disparate characteristics as a result of the disparate characteristics of the connections making up the various possible signal paths. Further, characteristics of different data flows and characteristics associated with different wireless devices 120 may vary. As a result, certain signal paths may be better for certain data flows than for other data flows. Further, the performance of the overall network may change based on which signal paths data flows are routed down. Thus, a smart MME may determine an optimal signal path for each data flow requested by a wireless device 120.

The determination of an optimal signal path for each data flow may be made based on what would be optimal from an overall network perspective, on what would be optimal from an individual flow perspective, or on a perspective that balances what would be optimal from overall network perspective and an individual flow perspective. Optimization from an overall network perspective may mean determining a signal path for each data flow that would result in optimum overall network performance, measured by any suitable metric such as, for example, overall network data throughput (e.g., bits per second), regardless of how this path determination might affect the performance of the individual flow. For example, if overall network data throughput is the metric used for overall network performance, an optimal signal path from the overall network perspective would be the signal path that would result in the highest network data throughput. Optimization from an individual flow or individual user perspective may mean determining a signal path for a data flow that would result in optimum performance for that given data flow based on the characteristics of that given data flow, measured by any suitable metric such as, for example, data throughput of the given data flow (e.g., bits per second), delay tolerance, minimum or maximum data rate, error rate requirement, etc., regardless of how this path determination affects the overall network performance. Different data flows may have different metrics for optimization based on their particular characteristics—for example, a VoIP data flow may have characteristics indicating that signal path having a lowest latency is optimal, while a streaming video download data flow may have characteristics indicating that signal path having a largest available bandwidth may be optimal for the given data flow. A signal path that is optimal for a given data flow from the individual flow perspective may or may not be the same as the signal path that is optimal from the overall network perspective. In a case in which optimization from an overall network and from an individual flow perspective yield different results, optimization from a balanced perspective may mean determining a signal path for a data flow that strikes a desirable balance between the two. For instance, balancing individual and overall network performance may entail selecting those signal paths that result in the best possible overall network performance and that would still ensure at least minimally acceptable signal paths for each data flow. Thus, for example, the criteria for minimal acceptability for each data flow may be used to determine a subset of the possible signal paths that are minimally acceptable for the respective data flow, and then from within this subset of minimally acceptable signal paths the signal path that is optimal from an overall network perspective is selected for the respective data flow. Thus, the optimization may be based on the characteristics of each data flow (minimally acceptable signal paths may be determined for each data flow), and the optimization may be additionally based on overall network performance (a network-optimal signal path may be selected from among the minimally acceptable signal paths determined). Thus, individual flow performance and overall network performance may be balanced in determining an optimal signal path. The ultimately selected optimal signal path on the balanced perspective may or may not be optimal from the individual perspective or from the overall network perspective.

As an example of balancing optimization from an individual perspective and an overall network performance perspective, consider the following. Suppose a given data flow for which an optimal path is being determined is a VoIP data flow that has criteria for minimally acceptable signal paths which specify a maximum latency of 100 ms, and five possible signal paths exist for the given data flow: path A (latency=150 ms), path B (latency=90 ms), path C (latency=80 ms), path D (latency=190 ms), and path E (latency=75 ms). Suppose further that path C is the one of paths B, C, and E that would result in the best overall network performance out of those options, that path A is the signal path that optimizes overall network performance if all of the signal paths are considered, and that path E the signal path that is optimal from an individual flow perspective. In such a case, optimization from the individual perspective selects path E as the optimal path, and optimization from the overall network performance perspective selects path A as the optimal signal path. However, optimization from the balanced perspective selects path C as the optimal signal path, since only paths B, C, and E are minimally acceptable for the given data flow (based on the characteristics of the data flow and the characteristics of the signal paths) and therefore the optimal signal path is selected only from the among the subset consisting of paths B, C and E. Path C being the one of paths B, C, and E that would result in the best overall network performance out of those options, is thus selected as the optimal path. Although path A would result in better overall network performance, it is not selected as optimal because it is not in the subset of minimally acceptable paths for the given flow. Details of an exemplary process of optimization will be further described below.

In addition, characteristics of the connections may be continually changing, and the state of data flows may be continually changing. In one exemplary approach, a smart MME may also dynamically reassess optimal signal paths for each active data flow on the network in real time. Upon reassessment, if a different signal path is determined to be optimal, then the MME may be configured to re-route the data flow down the newly determined optimal signal path. Thus, for example, a signal path initially determined to be optimal for a given data flow may be changed thereafter by the MME, and the given data flow may be rerouted accordingly. The reassessment of optimal signal paths may be made when one or more selected network events occurs. The selected network events may include the addition/removal of any data flow, the attachment/disconnection of a wireless device, downgrading/upgrading a given data flow, a change in path characteristics exceeding a predetermined threshold, the passage of a predetermined period of time (e.g., once every second), and the like. For example, suppose an optimal signal path A is determined for a given data flow that has minimum acceptability criteria specifying a maximum path latency of 100 ms and the given data flow is routed down path A. Subsequently, path A's latency increases beyond a predetermined amount—for instance, from 95 ms to 110 ms. This change in the latency of path A may be determined to be a network event, and an optimal signal path may be reassessed for the given data flow, which may result in the flow being routed down a different path than path A, since path A is no longer minimally acceptable. It is to be understood that optimal signal paths may be reassessed for all active data flows upon the occurrence of the network event, not only those data flows (if any) that are directly associated with the given network event. Thus, for example, when a request for a new data flow is received, this may be considered a network event and, not only is an optimal signal path determined for the new requested data flow, but optimal signal paths may also be reassessed for each of the currently active data flows as well.

As noted above, different applications on the wireless device 120 may transmit or receive data having dissimilar characteristics or even the same application may involve data transfer types or rates having dissimilar characteristics at different times. For example, different types of data flows may have different characteristics that result in different minimum and/or optimum requirements for the characteristics of the connection carrying the data flow. For example, a Voice-over-IP (VoIP) application data flow may require comparatively low latency while a TCP-based application data flow (e.g., email, internet) may tolerate comparatively high latency. As another example, a buffered video streaming data flow may tolerate moderately high latency (due to the buffering), but might need a fairly large guaranteed bit rate for meaningful video streaming without freezing. In addition, even if two data flows are of the same type, they may still have different characteristics, such as a data-amount of the content requested. For example, two different video downloads may have the same type of data flow (e.g., a buffered streaming video type data flow), but one video may have a higher resolution than the other.

As further illustrative examples of certain types of data flows and characteristics thereof, the standardized 3GPP QoS class of identifiers (QCI) may be considered. The 3GPP standard generally refers to "bearers," which can be considered as examples of some types of data flows. Bearer is a virtual concept defining how wireless device data is treated when it travels across the network. The network might treat dissimilar data in different ways, with each class of treatment being a separate bearer. These bearers can be thought of conceptually as different flows of data, although the bearers may or may not travel along the same physical path.

Thus, because the characteristics of the data flows and of the signal path vary, one flow may preferably be routed on one signal path between the wireless device 120 and the EPC 125, while a second flow may preferably be routed on a second signal path between the wireless device 120 and the EPC 125. Taking the aforementioned example of the VoIP data flow and the email data flow, the VoIP data flow may preferably be routed down a signal path with the lowest latency, while the email data flow may acceptably be routed down a signal path with high latency. Therefore, quality of service for the individual data flow and/or performance of the overall network is optimized with the signal paths being used by the type of traffic that may best be utilized by that path.

Figure 3:
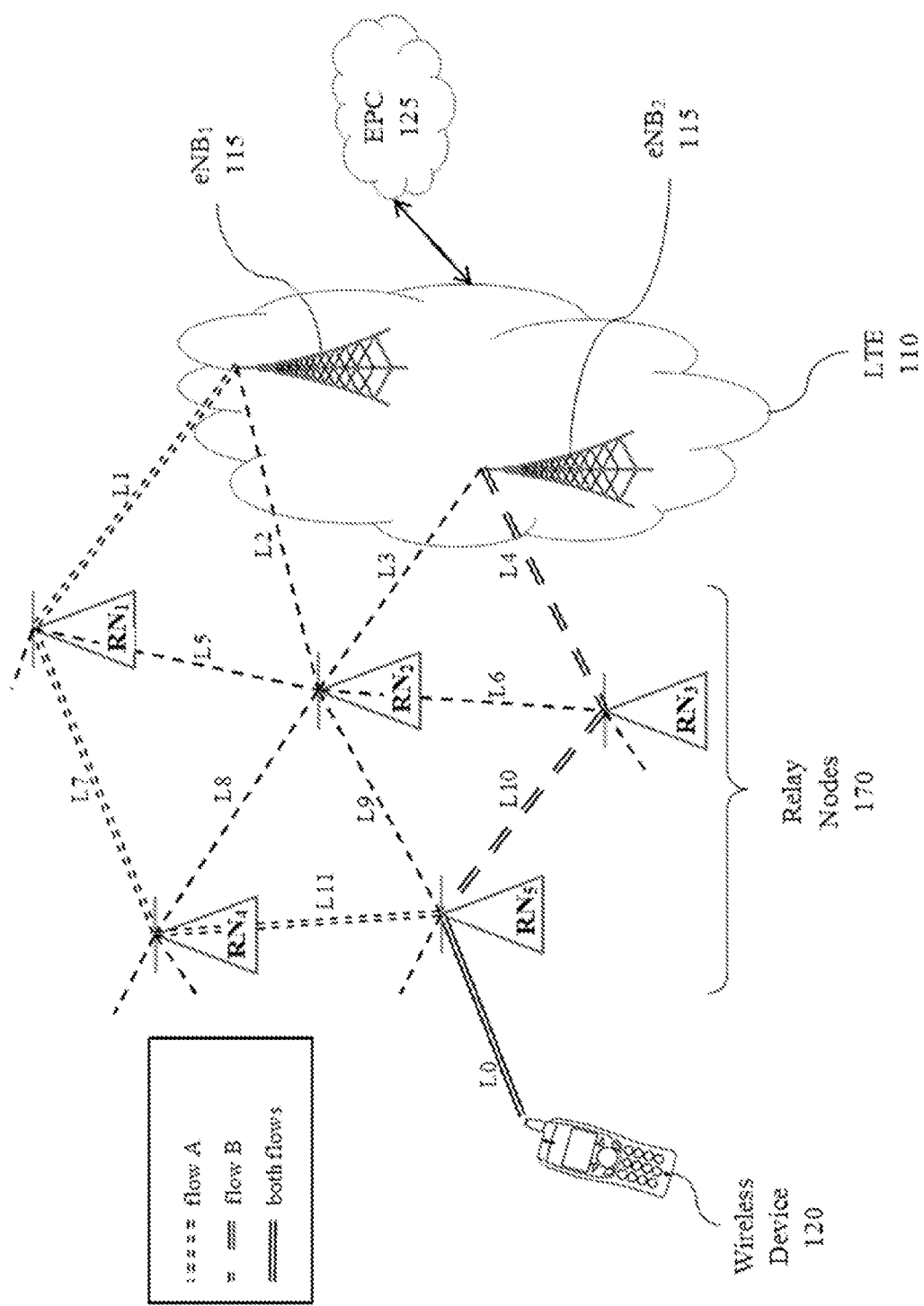
FIG. 3 illustrates exemplary data flows on the exemplary access network of FIG. 2.

FIG. 3 illustrates an example of two different flows being routed along different signal paths between the wireless device 120 and the EPC 125 in the exemplary mesh network of FIG. 2. Flow A is routed from the wireless device 120 to the $eNB_1$ 115 along a signal path including connections L0, L11, L7, and L1. Flow B is routed from the wireless device 120 to the $eNB_2$ 115 along a signal path including connections L0, L10, and L4.

Each wireless device 120 may also have different characteristics associated therewith, which may include both characteristics of the device itself and subscriber characteristics. For example, the wireless device 120 may include a unique identifier (e.g., a serial number) and any other information that allows the system 100 to identify characteristics of the wireless device 120 (e.g., make, model, modes, etc.), as well as the subscriber associated with the wireless device 120. The wireless device 120 may include a subscriber identity module ("SIM"). More detailed information concerning a subscriber such as profile information may also be available, which may even include information related to optimization and quality of service considerations. Characteristics associated with a wireless device 120 may include historical information of interest, which may include errors or the like related to past data transfers, information about characteristics of previously requested data flows, information about a previous location of the wireless device (i.e., whether the device is moving), etc.

The choice of an optimal signal path for a data flow may be based on the characteristics associated with the wireless device 120 (and associated user) in addition to the characteristics of the flow and the characteristics of the signal paths. For example, the characteristics of the wireless device 120 may influence the minimum requirements that are associated with a given type of flow, such that a same type of data flow may have different minimum requirements for two different wireless devices 120. For example, a wireless device 120 that requires voice communication (e.g., a mobile phone) may require a minimum latency for a VoIP flow that is higher than a minimum latency for a VoIP flow required by a second wireless device 120 that does not require such voice communication (e.g., a tablet device). As another example, the minimum guaranteed bandwidth for a video streaming data flow for a user who subscribes to a premium service may be larger than the minimum guaranteed bandwidth for a video streaming data flow for a user who does not subscribe to a premium service. As another example, a wireless device 120 whose history indicates that it has utilized above a certain amount of network resources in a predetermined period of time (e.g., the user is consuming a disproportionate share of the available network resources) may have its minimum requirements for that type of flow temporarily altered such that signal paths that previously might not have qualified as minimally acceptable (e.g., signal paths with higher latency) would now qualify as minimally acceptable (e.g., the flow may be "downgraded" as a result of the excessive consumption of resources). As a further exemplary illustration, a wireless device 120 whose history indicates that a current data flow is utilizing less than an amount of network resources specified by its normal minimum requirements may have its minimum requirements temporarily changed to reflect this (e.g., the flow may be temporarily downgraded). For example, a given data flow may be an IM data flow, with particular minimum acceptability criteria associated therewith. However, the IM data flow is utilizing network resources well below its minimum acceptability criteria (i.e., a wireless device is running an IM application, but is not sending message with it or is sending messages only intermittently), and thus in order to "free up" resources that may have been reserved for this data flow but which this data flow is not utilizing, the data flow may be temporarily downgraded. The downgrade for the given data flow may be reversed when the usage of the data flow returns to normal levels (i.e., when sending of messages via the IM application is resumed).

The aforementioned examples of changing minimum requirements for data flows may be performed for some users and not for others based, for example, on a subscription status of the user, which may be one of the characteristics associated with the wireless device 120. A threshold that triggers such a change in requirements may be set in accordance with a service agreement between the operator of the network and the wireless device 120 user, and may vary between wireless devices 120. The change in minimum requirements for a given data flow may result in a different signal path being determined as optimal for the given data flow, since the optimal signal path for the data flow may be selected from among a set of minimally acceptable signal paths and the set of minimally acceptable signal paths may now include certain signal paths that were not included prior to the change in minimum requirements for the given data flow. The change in requirements may be temporary, and may be for a predetermined period of time or may last until specific events occur, such as network conditions improving beyond a predetermined threshold (e.g., congestion subsides). Requirements for types of data flows may be determined in advance and stored, for example, in a reference table. When an optimal signal path is determined for a given data flow, the requirements for that given data flow may be determined by determining the type of data flow, consulting the reference table for that type of data flow, and altering the requirements specified by the reference table according to the characteristics associated with the wireless device 120 (and associated user) as appropriate.

In addition, the characteristics of the wireless device 120 may provide a selection rule for cases in which a determination based solely on characteristics of the flow and the characteristics of the signal paths yields multiple equally optimal signal paths. For example, a wireless device 120 that indicates that its subscriber is paying for "premium" service may be given priority over a wireless device 120 that pays less for a lower quality of service, such that the wireless device 120 with priority may have its flow routed down the best path (from an individual flow perspective) out of the multiple equally optimal signal paths (from the balanced perspective) as compared to the device associated with a less expensive class of service. For example, assume that data flow A and data flow B are two data flows for which optimal signal paths are being determined, and data flow A comes from a wireless device 120 subscribing to a premium service while data flow B does not. If both signal paths 1 and 2 would be equally optimal from the balanced perspective for both of data flows A and B, then data flow A may be routed down the one of paths 1 and 2 that is optimal from an individual perspective. As another example, a wireless device 120 whose history indicates that flows of a certain type requested by the wireless device 120 are frequently larger than normal for that type of flow may be assigned to a signal path out of the multiple equally optimal signal paths having the greatest possible overhead, in order to provide room for usage that may result from this data flow that exceeds the normal minimum acceptability requirements for flows of that type. For example if a wireless device consistently sends MMS messages that are much larger than normal, then, all other things being equal, the MMS data flow may be assigned to the one of multiple equally optimal (from a balanced perspective) signal paths having a largest bandwidth overhead. Further, if network conditions are such that not all data flows of all wireless devices 120 can be provided a minimally acceptable signal path, a history of the wireless devices 120 usage, a subscriber status, etc., may determine which if any of the data flows may be provided subpar signal paths.

Figure 4:
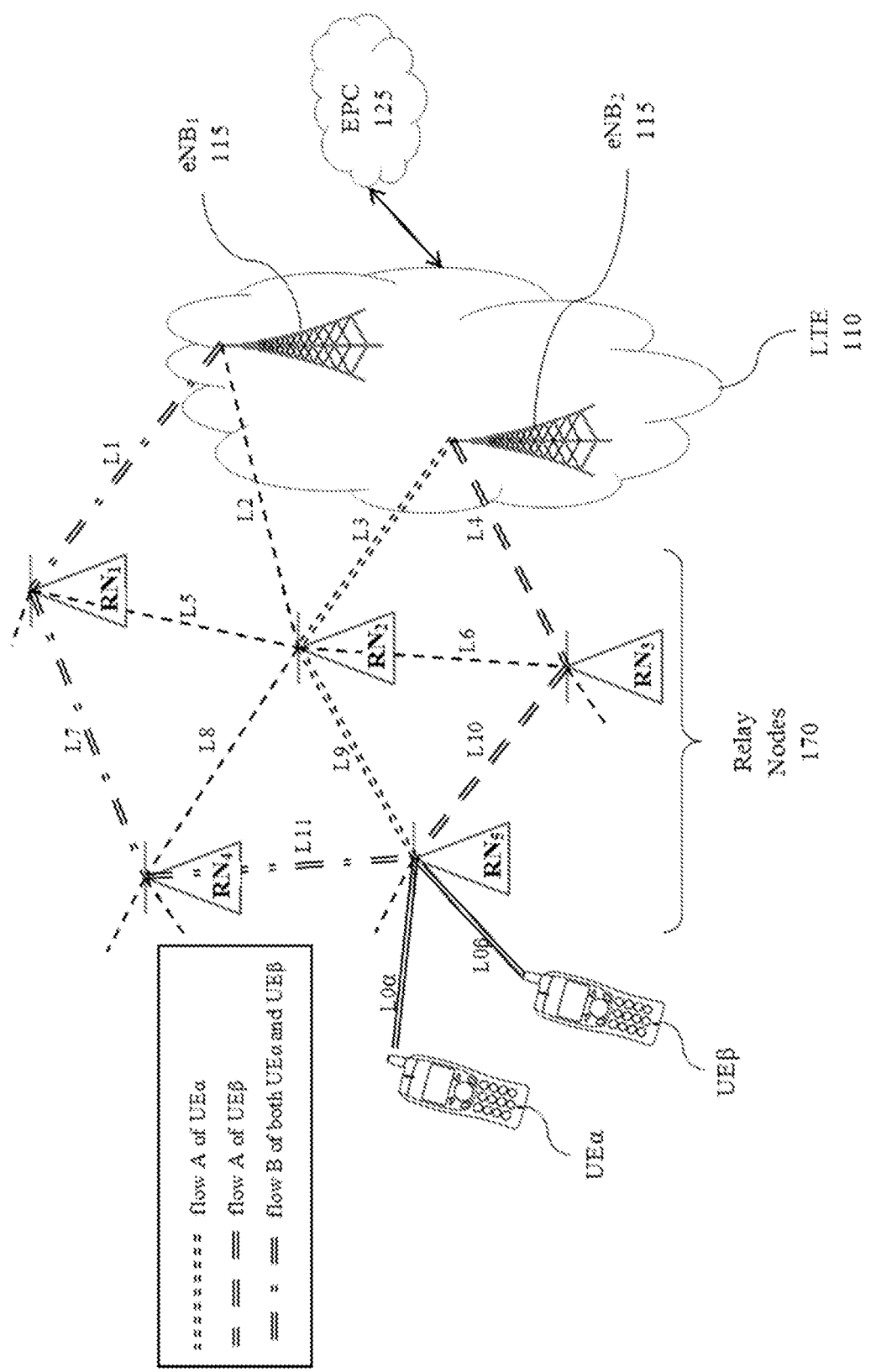
FIG. 4 illustrates exemplary data flows on the exemplary access network of FIG. 2.

FIG. 4 illustrates a situation in which characteristics of different wireless devices 120 affect the optimal signal path determined. In FIG. 4, the exemplary mesh network of FIG. 2 is shown with two different wireless devices in the form of different user equipment 120, UEα and UEβ, which have different characteristics from one another. A flow A from UEα is routed down a signal path comprising connections s9 and s3. On the other hand, a flow A from UEβ is simultaneously routed down a different path comprising connections L10 and L4. Both flows A have essentially similar characteristics (e.g., are flows of a same type, same size, etc.), are being requested simultaneously, but different paths are determined to be optimal based on the differing characteristics of the particular user equipment 120. The differences in characteristics between the wireless devices 120 may affect some data flows but not others, or may affect certain data flows only under certain circumstances—that is, just because two wireless devices are different does not necessarily mean that all or any of the two devices respective types of data flows must be routed down different paths. Thus, for example, FIG. 4 illustrates flows B of both UEα and Ueβ, the flows B having essentially similar characteristics as each other and being different from the flows A, taking the same signal path as each other comprising connections L11, L7, and L1 despite the fact that UEα and UEβ have different characteristics.

Figure 5:
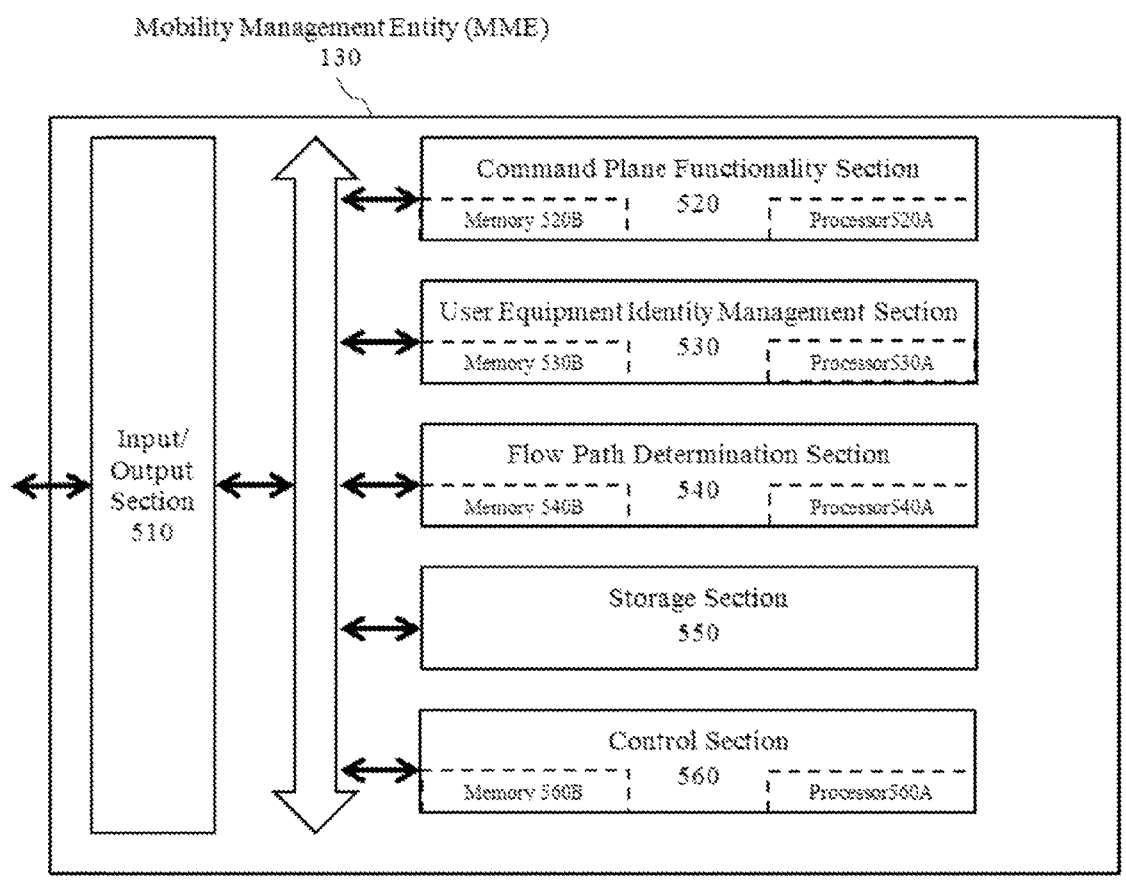
FIG. 5 illustrates an exemplary mobility management entity.

An exemplary smart MME 130 is illustrated in FIG. 5. While an exemplary MME 130 is shown in FIG. 5, the exemplary components illustrated in FIG. 5 are not intended to be limiting. Indeed, additional or alternative components and/or implementations may be used. The exemplary MME 130 of FIG. 5 may include an Input/Output Section 510, a Command Plane Functionality Section 520, a Wireless Device Identity Management Section 530, a Flow Path Determination Section 540, a Storage Section 550, and a Control Section 560, which may each be communicably connected to one another. The MME 130 may be implemented in or include one or more computing devices configured to perform the processes described herein. For example, the MME may include multiple computing devices communicably connected to one another, each individual computing device including a processor, a memory, and the like as well known in the art. For example, in FIG. 5 the Command Plane Functionality Section 520 is shown as potentially being a computing device including a Processor 520A and a Memory 520B, the Wireless Device Identity Management Section 530 is shown as potentially being a computing device including a Processor 530A and a Memory 530B, the Flow Path Determination Section 540 is shown as potentially being a computing device including a Processor 540A and a Memory 540B, and the Control Section 560 is shown as potentially being a computing device including a Processor 560A and a Memory 560B. However, it will be understood that one or more of the various sections illustrated may be implemented on the same computing device, and/or that a section may be implemented across multiple computing devices. Further, the MME 130 may be implemented on a single computing device, in which case the Control Section 560 might be the only section to include a processor, memory, and the like. In certain exemplary approaches, elements of the MME 130 may include any computer hardware and/or instructions (e.g., software programs), or combinations of software and hardware, configured to perform the processes described herein. In particular, it should be understood that elements of the MME 130 may be implemented on one physical computing device or may be implemented on more than one physical computing device. Accordingly, the MME 130 may include any one of a number of computing devices, and may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

Accordingly, the processes described herein may be implemented at least in part as instructions executable by one or more computing devices. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

The Input/Output Section 510 may be configured to receive input from and provide output to the LTE network 110, the IMS 145, and/or other sections of the EPC.

The Command Plane Functionality Section 520 may be configured to perform control-plane functionality, including protocols and communications paths used to configure the network to meet user demand for data services, such as the establishment of connections, the control of attributes, the routing or re-routing of established connections, and the assignment and reassignment of resources to wireless device 120. In particular, the Command Plane Functionality Section 520 may be configured to control the signal path of data flows based on the determination of optimal path by the Flow Path Determination Section 540.

The Wireless device Identity Management Section 530 may be configured to manage mobility information, wireless device 120 identities, and security parameters. For example, the Wireless device Identity Management Section 530 may be configured to determine characteristics of wireless devices 120 attached to or attempting to attach to the LTE network 110, such as an identity of the wireless device 120 and/or subscription information of a user thereof. The Wireless device Identity Management Section 530 may be configured to handle authentication of wireless devices 120 attached to or attempting to attach to the LTE network.

The Flow Path Determination Section 540 may be configured to determine an optimal flow path for requested data flows based on the characteristics of the different flows, the characteristics of the different signal paths, and the characteristics of the wireless device 120 requesting the flow. Exemplary processes whereby an optimal path is determined will be discussed in greater detail below.

The Storage Section 550 may store various data and programming accessed by other sections of the MME 130. Although a single Storage Section 550 is illustrated, it will be understood that the Storage Section 550 may include one or more data storage mediums, devices, or configurations and may employ any type, form, and combination of storage media known to those skilled in the art, including hard disk drives, read-only memory, caches, databases, optical media, and random access memory. Storage Section 550 may store any suitable type or form of electronic data representative of the content and data described herein.

The Flow Path Determination Section 540 may be configured to dynamically determine which signal path is optimal for each data flow between any given wireless device 120 and the EPC 125, based on the characteristics of the data flow and the existing conditions of the network, which include the characteristics of the various connections of the mesh network. For example, a processor such as Processor 540A or Processor 560A may determine the optimal path by running an appropriate program stored in Memory 520B, Memory 560B, the Storage Section 550, etc.

Figure 6:
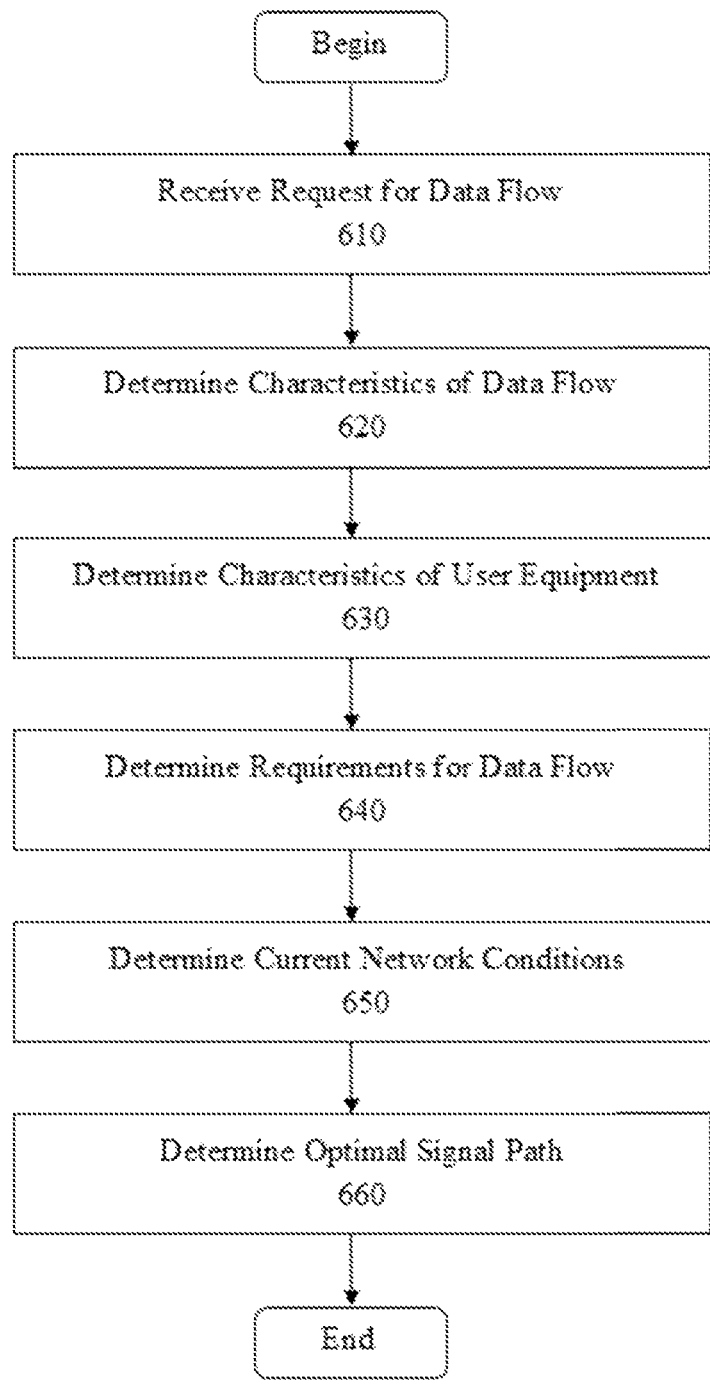
FIG. 6 illustrates an exemplary process flow for determining an optimal signal path.

FIG. 6 illustrates an exemplary process whereby an optimal path for a given data flow may be determined. In process block 610, a request for a given data flow may be received from an attached wireless device 120. If the optimal signal path for a previously requested data flow is being reassessed, then no new request for a data flow is required and process block 610 may be skipped.

In block 620, the characteristics of the data flow may be determined, which may include the type and/or size of the data flow, as discussed above.

In block 630, the characteristics associated with the wireless device 120 requesting the data flow may be determined, which may include characteristics of the wireless device 120 itself or characteristics of a user of the wireless device 120, as discussed above.

In block 640, signal path requirements for the requested data flow may be determined, for example by accessing information stored in advance in the Storage Section 550 about various connection requirements associated with various types of data flows. The information on connection requirements preferably may include information about minimum or optimum connection requirements for types of data flows that have characteristics similar to the characteristics determined in block 620. The connection requirements for the data flows may depend on the characteristics associated with the wireless device 120 requesting the data flow determined in block 630.

In block 650, current conditions of the network, including the current characteristics of the various connections between the relay nodes 170, may be determined, for example by accessing information stored in advance in the Storage Section 550 which is updated periodically.

In block 660, the optimal signal path for the requested data flow may be determined, balancing individual performance and overall network optimization. For example, the optimal signal path may be determined by first determining a set of minimally acceptable signal paths for the given data flow by comparing the current characteristics of the various connections with the determined minimum requirements for the data flow. There may be multiple signal paths that meet the minimum requirements for the data flow, in which case a signal path that optimizes overall network performance (e.g., maximizes network throughput) may be selected.

Figure 7:
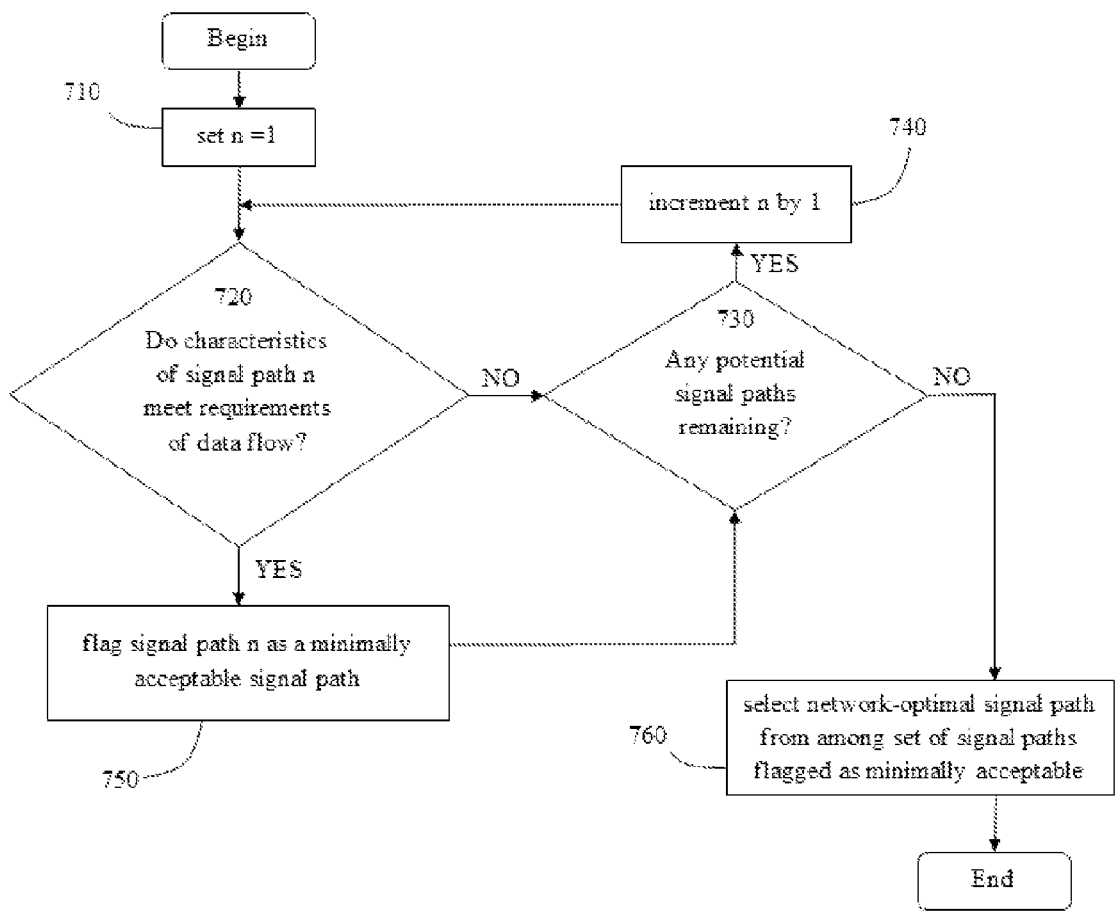
FIG. 7 illustrates an exemplary process flow for determining an optimal signal path.

FIG. 7 illustrates one example of how the determination of process block 660 may be effected. In process step 710, n is set to equal 1.

The process then passes to decision block 720, in which it is determined whether the characteristics of signal path n meet the requirements of the given data flow.

If the result of decision block 720 is positive, then the process passes to step 750, in which the signal path n is flagged as a minimally acceptable signal path for the given data flow. The process then passes to decision block 730.

Further, if the result of decision block 720 is negative, then the process passes to decision block 730, in which it is determined whether any further potential signal paths remain to be considered. The set of signal paths to be considered may include all possible signal paths, or may be narrowed down in advance to a subset of all possible signal paths. For example, geographical restrictions may be imposed (e.g., only signal paths including relay nodes within X miles of the wireless device are considered), or certain signal paths may be removed from consideration before the process begins based on relevant selection criteria (e.g., paths known in advance to always be inappropriate for a certain type of data flow may be excluded from the process when the data flow is of that type).

If the result of decision block 730 is positive, then the process passes to step 740, in which n is incremented by 1, after which the process passes back to the decision block 720.

If the result of decision block 730 is negative, then the process passes to step 760. In step 760 an optimal signal path is selected for the given data flow from among those signal paths that have been flagged as minimally acceptable for the given data flow, the optimal signal path being the one of the flagged paths that would optimize performance of the entire wireless access network. For example, results of assigning the given data flow to each signal path may be projected (e.g., overall network throughput is estimated) and a signal path having the best projected result is selected.

Optimal signal paths may also be reassessed for each active data flow at the same time that an optimal signal path is being determined for the given data flow, in which case the step 760 may be performed concurrently for each signal path and the projections of results may include predicting throughput for each permutation of combined signal path assignments. As a simplified example, consider a case in which there are three signal paths 1, 2, and 3 and there are two data flows A and B, with signal paths 1 and 2 being minimally acceptable for flow A and signal paths 2 and 3 being minimally acceptable for flow B. In this example, there are four permutations of path assignments: (1) [A,1] and [B,2], (2) [A,1] and [B,3], (3) [A,2] and [B,2], and (4) [A,2] and [B,3]. Therefore, in the example, the selection of an optimal signal path in step 760 may include predicting the overall network performance resulting from each of the four permutations of path assignments, and selecting the permutation with the best result. As the number of potential signal paths and the number of data flows increase, the number of permutations greatly increases, and therefor exclusion rules may be employed to limit a number of permutations for which predictions are made. For example, physically impossible permutations may be excluded (e.g., the number of data flows assigned to a single path exceeds the capacity of any path), permutations determined in advance to be unlikely candidates for optimality may be excluded (e.g., all or a large number of flows assigned to one or only a few paths; some paths left unutilized), duplicative permutations may be excluded, and so on.

If no signal path is minimally acceptable for the given data flow (i.e., if the result of decision block 720 was negative for all signal paths), then an error may be reported to the Control Section 560. The error indicates that no acceptable signal path is available and may cause appropriate fallback measures to be implemented, such as determining a next-best signal path for the requested data flow, dropping or demoting certain data flows to create an acceptable path for the requested data flow, denying the request for the data flow, etc. After determining the optimum signal path or generating an error in block 760, the process ends.

Thus, when a wireless device 120 requests any given data flow, the MME 130 can determine an optimal routing path for that given data flow, based on the characteristics of the data flow and on the current characteristics of the various possible signal paths. In one exemplary illustration, multiple signal paths may meet minimum requirements for a given data flow. However, in the exemplary illustration the MME 130 may select from among these minimally acceptable signal paths an optimal signal path that optimizes the performance of the overall network, even if that particular path is not the "best" (e.g., fastest, smallest error rate, etc.) path for that individual data flow itself. When there are multiple equally optimal signal paths, the MME 130 may arbitrarily choose one of the multiple equally optimal signal paths to be the optimal signal path, may choose the one of the multiple equally optimal signal paths that is the best of the multiple equally optimal signal paths from an individual flow perspective, and/or may utilize a selection criteria based on the characteristics of the wireless device 120, as discussed above.

The MME 130 may determine optimal signal paths for flows on a per-wireless device, per-flow basis in order to optimize overall network performance. That is, optimal signal paths (from the viewpoint of the overall network) may be determined for each wireless device 120 based on the individual characteristics thereof. Further, optimal signal paths (from the viewpoint of the overall network) may be determined for each individual data flow based on the characteristics thereof. Further, the determinations may be made dynamically based on current network conditions, and may change in real time as network conditions change. This is in contrast to related methods of controlling signal paths for data flows, which may not distinguish between different wireless devices 120 connected to a same relay node 170 (i.e., do not determine optimal paths per-wireless device), may not distinguish between the different flows of a given wireless device (i.e., do not determine optimal paths per-flow), and/or may attempt to optimize throughput parochially (e.g., by cluster, by sector, by node, etc.) without concern for the overall network.

Figure 8:
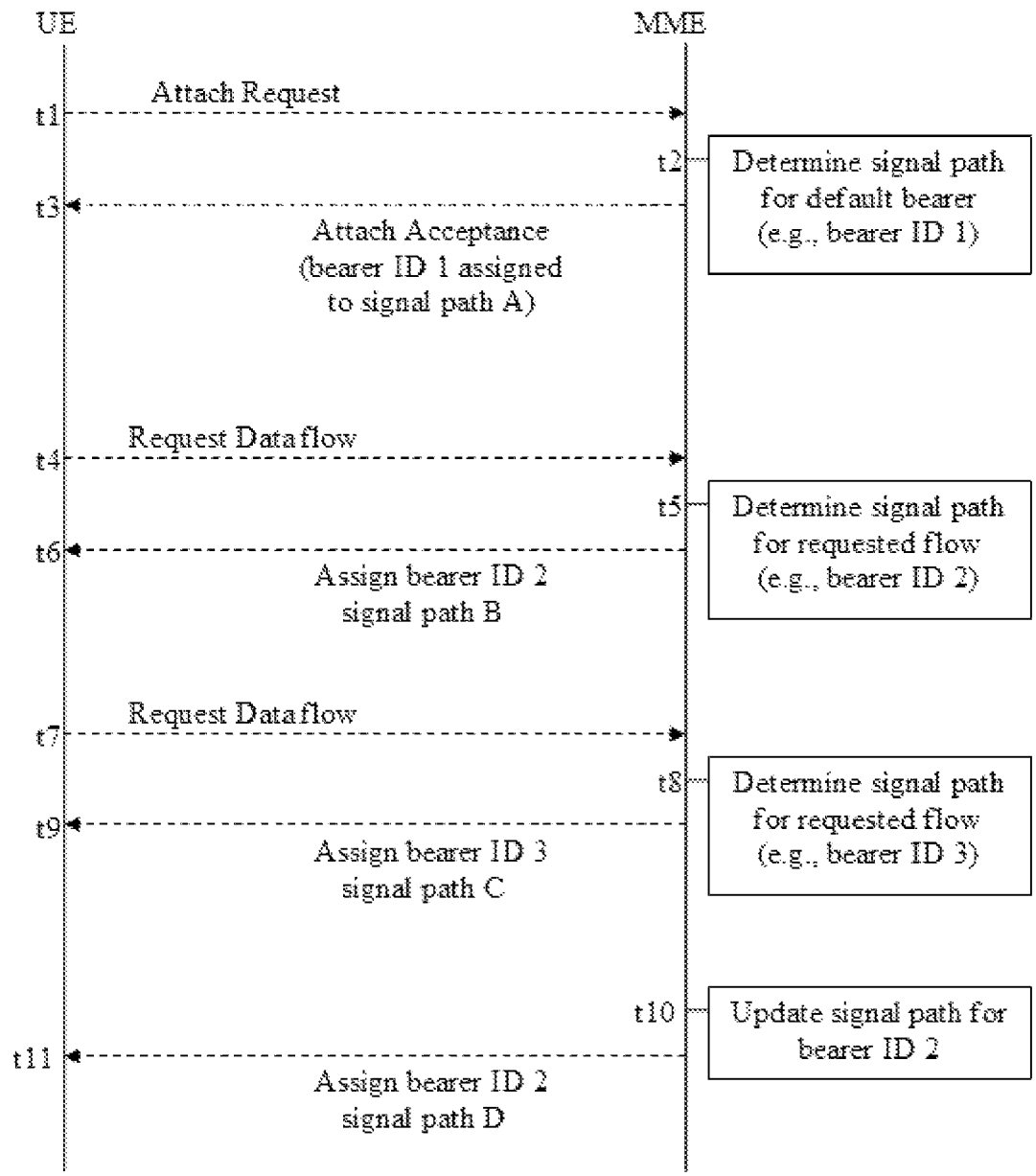
FIG. 8 illustrates an exemplary communication between a piece of user equipment and mobility management entity.

FIG. 8 illustrates an exemplary process of dynamically determining routing of flows. At time t1, a wireless device 120 (UE) may request to attach to the network. The MME performs certain wireless device identity management functions, such as mutual authentication, and at time t2 determines an optimal signal path for a default bearer (e.g., bearer ID 1) for the UE. Further, the request for attachment may be considered a network event, and at time t2 the MME may reassess optimal signal paths for each active data flow in addition to determining an optimal signal path for the default bearer for the UE. Although in this example the default bearer's signal path is determined by the optimization procedures described with respect to FIGS. 6 and 7, it should be noted that a default bearer may be treated differently than other requested data flows and, for example, may be assigned a fastest route between the UE and the MME regardless of overall network optimization. At time t3 the MME 130 signals the UE of the acceptance of the attachment request and of the signal path assigned to the default bearer. The default bearer generally remains established throughout the lifetime of the connection in order to provide the UE with always-on IP connectivity to that PDN. The initial bearer-level QoS parameter values of the default bearer are generally assigned by the MME, based on subscription data retrieved from the HSS.

At time t4, the UE requests a data flow having certain characteristics. At time t5, the MME 130 determines an optimal signal path for the requested data flow based on current network conditions and the characteristics of the UE and the characteristics of the data flow, and at time t6 assigns the data flow (e.g., bearer ID 2) to the optimal signal path (e.g., signal path B). Further, the request for a new data flow may be considered a network event, and at time t6 the MME may reassess optimal signal paths for each active data flow in addition to determining an optimal signal path for the requested data flow.

At time t7, the UE requests a data flow of a second type. At time t8, the MME 130 determines an optimal signal path for the requested data flow based on current network conditions the characteristics of the UE and the characteristics of the data flow, and at time t9 assigns the data flow (e.g., bearer ID 3) to the optimal signal path (e.g., signal path C). Further, the request for a new data flow may be considered a network event, and at time t8 the MME may reassess optimal signal paths for each active data flow, including the first data flow requested by the UE (bearer ID 2), in addition to determining an optimal signal path for the newly requested data flow. In this example, the reassessment for bearer ID 2 of the UE results in the same optimal signal path determination, and thus no new path assignment is made for bearer ID 2.

At time t10, a network event occurs (not necessarily related to the UE) causing the MME 130 to reassess optimal signal paths for each active data flow, including bearer IDs 2 and 3 of the UE. The MME 130 determines that the signal path assigned to bearer ID 2 is no longer optimal (e.g., network conditions have changed since the previous determination), and assigns a new optimal path (e.g., signal path D) to the data flow. Thus, the optimal signal path may be determined on a per-UE per-flow basis upon attachment and upon requests for data flows, and may also be updated on a per-UE per-flow basis as network events occur.

FIG. 9 shows one example of a possible data store of characteristics of connections L1 to LN between relay nodes 170 of the mesh network, which the MME 130 may consult when determining optimal signal paths. The relay nodes 170 may be configured to report their characteristics periodically such that the database may be updated and optimal signal paths determined based on substantially current network conditions.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method comprising,
receiving requests for data flows over a wireless access network between wireless devices selectively attached to the wireless access network and a core network communicably connected to the wireless access network, the wireless access network including at least one base-station node and a plurality of relay nodes communicably connected in a mesh-network topology such that for each of the wireless devices there are a plurality of potential signal paths on the wireless access network between the respective wireless device and the core network;
determining, for a requested data flow of each of the wireless devices, an optimal signal path from among the plurality of potential signal paths based on characteristics of the plurality of potential signal paths and on characteristics of the data flow requested such that the determination of the optimal signal path balances performance of the entire wireless access network against individual performance for the respective requested data flow;
establishing a route for each requested data flow for which an optimal signal path has been determined in accordance with the optimal signal path determined for the respective data flow;
upon occurrence of select network events, reassessing the optimal signal path for at least one of the requested data flows that is currently active and for which a route has been established; and
establishing a new route for at least one of the requested data flows whose optimal signal path has been reassessed in accordance with the reassessment of the optimal signal path,
wherein the characteristics of the plurality of potential signal paths include bandwidth, occupancy rate, and quality of service, and
wherein the data flows that may be requested by the wireless devices include VoIP data flows, video data flows, and TCP-based data flows.

2. The method of claim 1,
wherein said balancing performance of the entire access network and individual performance for the respective requested data flow comprises optimizing throughput of the overall wireless access network within the constraints of acceptability criteria for the respective requested data flow for which an optimal signal path is being determined, the acceptability criteria depending on said characteristics of the data flow requested, such that an optimal signal path determined for any given data flow, while meeting the acceptability criteria for the given data flow, need not necessarily be optimal for the given data flow from an individual flow perspective.

3. The method of claim 2,
wherein the determining further comprises analyzing characteristics associated with the wireless devices, the characteristics including at least one of respective characteristics of the wireless devices and respective characteristic of users associated with the wireless devices, and
the acceptability criteria for each requested data flow for which an optimal signal path is being determined further depends on the characteristics associated with the wireless device requesting the respective data flow.

4. The method of claim 3,
wherein the respective characteristics associated with the wireless devices include at least one of a user history and a user subscription status.

5. The method of claim 1,
wherein said select network events include:
receiving a request for addition of a new data flow,
attachment of a wireless device to the wireless access network,
dropping of a data flow,
disconnecting of a wireless device from the wireless access network, and
a change in characteristics of any of the plurality of potential signal paths beyond a predetermined threshold.

6. The method of claim 5,
wherein said select network events further include passage of a predetermined period of time.

7. The method of claim 1, further comprising:
periodically receiving path information indicating current characteristics of the plurality of potential signal paths and basing the determining on the path information.

8. The method of claim 1,
wherein the wireless access network is a LTE wireless network including at least one eNode B node as the base-station node and the core network is an evolved packet core.

9. The method of claim 1,
wherein the characteristics of the potential signal paths further include at least one of latency and jitter.

10. A system comprising:
a wireless access network including at least one base-station node and a plurality of relay nodes communicably connected in a mesh-network topology; and
a core network communicably connected to the wireless access network, the core network including a mobility management entity,
wherein the wireless access network is configured to communicate with wireless devices such that there are a plurality of potential signal paths on the wireless access network between the wireless devices and the core network,
wherein the mobility management entity is configured to:
receive requests for data flows from the wireless devices;
determine, for a requested data flow of each of the wireless devices, an optimal signal path from among the plurality of potential signal paths based on characteristics of the plurality of potential signal paths and on characteristics of the data flow requested such that the determination of the optimal signal path balances performance of the entire wireless access network against individual performance for the respective requested data flow;
establish a route for each requested data flow for which an optimal signal path has been determined in accordance with the optimal signal path determined for the respective data flow;
upon occurrence of select network events, reassess the optimal signal path for at least one of the requested data flows that is currently active and for which a route has been established, and establish a new route for at least one of the requested data flows whose optimal signal path has been reassessed in accordance with the reassessment of the optimal signal path,
wherein the characteristics of the plurality of potential signal paths include bandwidth, occupancy rate, and quality of service, and
wherein the data flows that may be requested by the wireless devices include VoIP data flows, video data flows, and TCP-based data flows.

11. The system of claim 10,
wherein said balancing performance of the entire access network and individual performance for the respective requested data flow comprises optimizing throughput of the overall wireless access network within the constraints of acceptability criteria for the respective requested data flow for which an optimal signal path is being determined, the acceptability criteria depending on said characteristics of the data flow requested, such that an optimal signal path determined for any given data flow, while meeting the acceptability criteria for the given data flow, need not necessarily be optimal for the given data flow from an individual flow perspective.

12. The system of claim 10,
wherein the mobility management entity is further configured to analyze characteristics associated with the wireless devices, the characteristics including at least one of respective characteristics of the wireless devices and respective characteristic of users associated with the wireless devices, and
the acceptability criteria for each requested data flow for which an optimal signal path is being determined further depends on the characteristics associated with the wireless device requesting the respective data flow.

13. The system of claim 12,
wherein the respective characteristics associated with the wireless devices include at least one of a user history and a user subscription status.

14. The system of claim 10,
wherein said select network events include:
receiving a request for addition of a new data flow,
attachment of a wireless device to the wireless access network,
dropping of a data flow,
disconnecting of a wireless device from the wireless access network, and
a change in characteristics of any of the plurality of potential signal paths beyond a predetermined threshold.

15. The system of claim 10, further comprising:
wherein the wireless access network is configured to periodically send path-information indicating current characteristics of the plurality of potential signal paths to the mobility management entity and the mobility management entity is configured to base the determining on the path information.

16. The system of claim 10,
wherein the wireless access network is a LTE wireless network including at least one eNode B node as the base-station node and the core network is an evolved packet core.

17. The system of claim 10,
wherein the characteristics of the potential signal paths further include at least one of latency and jitter.

18. A non-transitory computer readable medium storing a software program, the software program being executable by at least one processor of at least one computing device to provide operations comprising:
receiving requests for data flows over a wireless access network between wireless devices selectively attached to the wireless access network and a core network communicably connected to the wireless access network, the wireless access network including at least one base-station node and a plurality of relay nodes communicably connected in a mesh-network topology such that for each of the wireless devices there are a plurality of potential signal paths on the wireless access network between the respective wireless device and the core network;
determining, for a requested data flow of each of the wireless devices, an optimal signal path from among the plurality of potential signal paths based on characteristics of the plurality of potential signal paths and on characteristics of the data flow requested such that the determination of the optimal signal path balances performance of the entire wireless access network against individual performance for the respective requested data flow;
establishing a route for each requested data flow for which an optimal signal path has been determined in accordance with the optimal signal path determined for the respective data flow;
upon occurrence of select network events, reassessing the optimal signal path for at least one of the requested data flows that is currently active and for which a route has been established; and
establishing a new route for at least one of the requested data flows whose optimal signal path has been reassessed in accordance with the reassessment of the optimal signal path
wherein the characteristics of the plurality of potential signal paths include bandwidth, occupancy rate, and quality of service, and
wherein the data flows that may be requested by the wireless devices include VoIP data flows, video data flows, and TCP-based data flows.

19. The medium of claim 18,
wherein said balancing performance of the entire access network and individual performance for the respective requested data flow comprises optimizing throughput of the overall wireless access network within the constraints of acceptability criteria for the respective requested data flow for which an optimal signal path is being determined, the acceptability criteria depending on said characteristics of the data flow requested, such that an optimal signal path determined for any given data flow, while meeting the acceptability criteria for the given data flow, need not necessarily be optimal for the given data flow from an individual flow perspective.

20. The medium of claim 18,
wherein said select network events include:
receiving a request for addition of a new data flow,
attachment of a wireless device to the wireless access network,
dropping of a data flow,
disconnecting of a wireless device from the wireless access network, and
a change in characteristics of any of the plurality of potential signal paths beyond a predetermined threshold.

* * * * *